United States Patent Office 3,395,175
Patented July 30, 1968

3,395,175
CONDENSATION PRODUCTS OF FORMALDE‑
HYDE AND PHENOLIC COMPOUNDS USE‑
FUL FOR TANNING
Fred A. Desiderio, Cornwells Heights, and Ian C. Somer‑
ville, Abington, Pa., assignors to Rohm & Haas Com‑
pany, Philadelphia, Pa., a corporation of Delaware
No Drawing. Filed Mar. 15, 1965, Ser. No. 439,956
7 Claims. (Cl. 260—507)

The present invention is concerned with a novel improved syntan, a method of tanning skin or leather with it, and the tanned leather obtained. It is particularly concerned with an improved astringent syntan, i.e., one which produces a "pebbled" appearance on the leather surface.

It is known to produce syntans by condensing a sulfonated aromatic compound and an unsulfonated aromatic compound by means of formaldehyde. It is also known that such condensation of a monocyclic phenol with a mildly sulfonated monocyclic phenol can be controlled to produce an astringent syntan. However, these products have the disadvantage of discoloration, either at the time of their initial production or on ageing the product of leather tanned therewith. Hence these products are unsuitable for the making of white leathers.

Bisphenol A (para,para'-isopropylidenediphenol) has been used for making syntans, e.g., by formaldehyde condensation of sulfonated bisphenol A with salicyclic acid, unsulfonated bisphenol A and some other unsulfonated phenolic compounds. See U.S. Patents 1,801,461 and 1,989,802. However, such condensation products are lacking in astringent quality, although some have been suitable for making white leather.

In accordance with the present invention, it has been found that a condensation product having tanning properties and outstanding astringency and freedom from discoloration, so that it is suitable for producing a pebbled effect on white as well as colored leathers can be produced by formaldehyde condensation of sulfonated bisphenol A (hereinafter referred to as SBPA) containing 1.5 to 2, and preferably 1.75 to 1.85, sulfonic groups per molecule with about 0.5 to 2 moles, per mole of SBPA, of phenolic material selected from the group consisting of 4,4-bis-(4'-hydroxyphenyl)-pentanoic acid (hereinafter referred to as DPA) and mixtures thereof with unsulfonated bisphenol A (hereinafter referred to as BPA) containing at least about 2% by weight of DPA in the mixture.

The SBPA may be prepared in any suitable fashion by any of the methods known in the art. It is dissolved in water and neutralized with caustic soda or other alkali metal hydroxide. In preparing the condensation product of the present invention, the aqueous solution of the neutralized SBPA may have any concentration, such as 30% to 60% by weight, but a concentration between 35 and 45% is generally most practical.

To this solution, the DPA or mixture of DPA and BPA is added in a proportion to provide 0.5 to 2 moles, and preferably 1.2 to 1.3 moles, of DPA (or DPA plus BPA) per mole of SBPA. Then an alkali metal hydroxide, such as caustic soda, is added to raise the pH to a value in the range of about 7 to 8.5. Any source of formaldehyde is then added. The commercial formalin (37% formaldehyde) is quite suitable. The amount of formaldehyde should be at least 0.7 mole (and up to 1.5 moles) per mole of SBPA when the proportions of unsulfonated phenolic material to be condensed with the SBPA is in the lower portion of the range and the amount of formaldehyde may be at least about 1.8 to 2.6 moles per mole of SBPA when the proportion of unsulfonated phenolic material is in the upper part of the range specified hereinbefore. When the preferred proportion of unsulfonated phenolic material is used, the formaldehyde is preferably in the range of about 1 to 1.8 moles per mole of SBPA. In the preferred products, the proportion of formaldehyde is about 0.5 to 0.7 mole per mole of the total weight of phenolic material (both sulfonated and unsulfonated).

The condensation may be effected at 85° to 130° C. at atmospheric or higher pressures for a period of 2 to 36 hours or more. Preferably, the aqueous reaction mixture containing the SBPA, the formaldehyde, and DPA (or mixture of DPA and BPA) is heated at reflux (usually about 102 to 105° C.) for 8 to 20 hours, the time depending on concentration.

The reaction product having a solids content anywhere from about 20 to 80% by weight and a concentration of about 5 to 40% by weight of active tanning component can be used "as is" at the conclusion of the reaction without separation therefrom. If desired, it may be acidified with a weak acid, such as glycollic or propionic acid. The product may be diluted wtih water to provide proper concentration for use in tanning. It may instead be concentrated or even dried, as by spray drying, if it is desired to conserve weight for shipment to the tannery.

The syntan of the present invention may be used for tanning any wet skin, hide or leather. It may be used as the sole tanning agent for converting a skin or hide to leather or it may be used in conjunction with another tanning agent, such as another syntan or a vegetable or mineral tanning agent, such as chestnut, quebracho, oak, zirconium, aluminum and chromium. When used in conjunction with other organic tanning agents, the syntan of the present invention may be used in the same bath with the other agent. On the other hand, the syntan of the present invention may be used as a pre-tanning agent wherein the leather tanned by it is subsequently subjected to another tanning agent of the various types mentioned hereinabove. Again, in another alternative procedure, a leather previously tanned with one of the other tanning agents may be retanned by means of the syntan of the present invention.

In using the syntan of the present invention as the sole tanning agent, or as a pretanning agent, it may be applied directly to the wet skin. Thus, a dry form of the syntan may be introduced into the tanning drum with the skins in wet condition such as they would be in as they are taken out of the bate or pickle bath. The bated and/or pickled skin may first be rinsed before the tanning agent is applied. If desired, the dry syntan may be mixed with sawdust or other inert carrier and then applied in the drum to the wet skins containing about 60 to 100% by weight of water based on the weight of dry skins.

Of course, the more common practice is to dissolve the syntan in water at any suitable concentration such as from about ½ to 10% in the liquor and then to introduce the skin or hide or a plurality thereof into a rotating drum containing the liquor, the proportion of syntan to the skin being from about 5 to 30% by weight effective tanning agent, based on the dry skin weight. The higher portions of this range are necessary to obtain satisfactory leathers when the syntan is employed as the sole tanning agent. Thus, when using it as the sole tanning agent, the proportion may be from about 15 to 30% and presumably about 20% based on the skin weight. Generally, the tanning is effected over a period of 4 to 24 hours. When the syntan is to be used as a pre-tannage to be followed by another tanning agent, a lower proportion of the syntan based on the weight of the leather may be employed whereas when the syntan is used as a re-tannage, a higher concentration is generally needed to react with the leather that has already been tanned. The tannage can be effected at any temperature from room temperature to about 100° F. The syntan of the present invention is quite effective in producing a pebbled effect even at room temperature whereas the effect can be made more pronounced or obtained more rapidly if the tanning is carried out at a higher temperature such as to 100° F. In the case of re-tannage, the temperature may range as high as about 170° F.

As is customary in tanning, the tanning liquor may be provided with a salt, such as sodium chloride or sodium sulfate, at a concentration from 1 to 5%, and presumably about 3%, based on the weight of the liquor. Some of this salt, or all of it in some cases, may be derived from the skin itself when a pickled skin is treated. When the skin is tanned by drumming in the liquor, the reaction is carried out for at least a period of ½ to 4 hours until the pebbled pattern is obtained; depending upon concentration, temperature and the previous history of the skin, the time required for the development of the pebble may be more or less. In most cases, as pronounced a pebble as is desired is obtained on the conclusion of about 2 hours drumming. This tannage can be followed immediately with a mineral or vegetable tan simply by adding the appropriate amount of the latter type of tanning agent to the tanning liquor in the drum at the conclusion of the ½ to 4 hours period just mentioned. For example, the re-tannage may be effected by means of 10% (by weight based on skin weight) of a highly basic chrome tanning agent or for example by means of 20% (weight based on skin weight) of a highly basic zirconium tannage.

When using the syntan of the present invention as a re-tannage agent the leather is generally first tanned to the normal extent in any suitable vegetable or mineral tanning liquor (such as chromium, zirconium, aluminum, quebracho, etc. However, if desired, the initial tannage may be carried out for less than the normal time, such as for a period of time which is from 75% or more of the usual tannage, so that the re-tannage by means of syntan may be effected on a leather which has either been partially or completely tanned by means of a vegetable or mineral tanning agent.

In one preferred embodiment, the leather obtained by mineral tannage, either partial or complete, may be removed from the tanning drum and split or shaved after which the split leather is returned to the drum and the syntan is introduced into the liquor in the drum in an appropriate amount. If desired also, the leather, whether it is split or shaved, may be rinsed and/or acidified, such as by means of oxalic acid, in the drum before effecting re-tannage with the syntan. The splitting of the vegetable tanned or mineral tanned leather before subjecting it to the syntan re-tannage is beneficial because it provides more uniform thickness and improves the uniformity of the pebble pattern. Acidification apparently serves to loosen the bonds of the pre-tannage at the surface of the leather so that the syntan is freer to exert its astringent or shrinking effect to render the pebble or pattern more pronounced. Also, the pebble may be increased by applying the syntan at relatively high concentrations in the range mentioned heretofore or it may be applied at elevated temperatures, such as from 130 to 170° F. and presumably about 140 to 150° F. Of course, all of these expedients, i.e. splitting, acidification, high concentration of re-tanning syntan, and high temperature during the re-tannage, may be used in conjunction to accentuate the effect obtainable with the syntan of the present invention.

The syntan of the present invention may be employed for tanning all sorts of skins or hides, such as snakeskin, lizard, crocodile, alligator, cowhide, and horsehide, but is especially valuable in the tanning of calfskin, kidskins, pigskins and sheepskins. The leathers obtained by the present invention have a wide variety of uses but are especially valuable in the making of shoe-upper and garment leathers, including glove leathers, and handbags. It is quite valuable in the treatment of side leathers for conversion to handbag leathers, especially of the types just noted.

To assist those skilled in the art to practice the present invention, the following modes of operation are suggested by way of illustration, parts and percentages being by weight and the temperatures in ° C. unless otherwise specifically noted.

(1) Into a 5 liter, 3-neck flask, equipped with an agitator, reflux condenser, and thermometer, is introduced 360 g. (3.6 mols) of sulfuric acid (98% technical). To this is added 456 g. (2 mols) of BPA. This mixture is heated for 3½ hours at 60–65° C. Then it is diluted with 910 ml. water and neutralized with 338 g. of 50% sodium hydroxide solution to raise the pH of the solution to 7–7½. It is then refluxed about 2 minutes to dissolve a slight amount of unreacted BPA. The produce is the sodium salt of SBPA containing about 1.8 sulfonate groups per mol of BPA.

Then there is added 715 g. (2.5 mols) DPA and the mixture is refluxed about 2 minutes to dissolve the DPA. It is cooled and there is added 187 g. of 50% sodium hydroxide to raise pH again to 7–7½.

There is added 220 g. (2.7 mols) of 37% formaldehyde and the mixture is refluxed 8 hours total time at approximately 106° C. It is allowed to cool.

Total Product=3170 gms. (Thero. wt.=3186 g.)

(2) Into a 500 ml., 3-neck flask, equipped with an agitator, reflux condenser, and thermometer, there is introduced 45 g. (0.45 mol) of sulfuric acid (98% technical). To this is added 57 g. (0.25 mol). This mixture is heated for 3½ hours at 60–65° C., then diluted with 114 ml. of water, and neutralized with 42 g. of 50% sodium hydroxide solution to raise pH to approximately 7½.

A mixture of 68.4 g. (0.3 mol) of BPA and 3.6 g. (0.0125 mol) of DPA is added and the mixture is refluxed about 2 minutes to dissolve the phenolic material. It is cooled and 44 g. of 50% sodium hydroxide solution is added to adjust pH again to approximately 7½.

Then there is added 27.5 g. (0.34 mol) of 37% formaldehyde, the mixture is heated to reflux, and held 8 hours at reflux (104–105° C.), and then cooled.

Total product=400 g.

(3) Into a 1,000 ml., 3-neck flask, equipped with an agitator, reflux condenser, and thermometer, there is introduced 144 g. (1.4 mols) of sulfuric acid (98% technical). To this is added 182 g. (0.8 mol) BPA. This mixture is heated for 3½ hours at 60–65° C. and then diluted with 364 ml. of water, and 139 g. of 50% sodium hydroxide solution is added. There is added 114 g. (0.4 mol) DPA and the mixture is refluxed several minutes, cooled to 50° C.—pH of 10% solution=3.7. There is added 58.6 g. (0.73 mol) of 37% formaldehyde. The mixture is heated to reflux, and refluxed for 8 hours.

Total product=996 g.

(4) Into a 1,000 ml., 3-neck flask, equipped with an agitator, reflux condenser, and thermometer, there is introduced 70 g. (0.7 mol) of sulfuric acid (98% technical). To this is added 90 g. (0.4 mol) BPA. This mixture is heated for 3½ hours at 60–65° C. It is then diluted with 180 ml. water, and 67 g. of 50% sodium hydroxide solution is added to raise the pH to 7–7½.

Then 57 g. (0.2 mol) DPA is added and the mixture is refluxed several minutes, cooled to 40° C. and 18 g. of 50% sodium hydroxide is added to raise pH to 7–7½. There is added 39 g. (0.48 mol) of 37% formaldehyde. The mixture is heated to reflux and refluxed 8 hours.

Total product=518 g.

(5) Into a 500 ml., 3-neck flask, equipped with an agitator, reflux condenser and thermometer, there is introduced 36 g. (0.36 mol) of sulfuric acid (98% technical). To this is added 46 g. (0.2 mol) BPA. This mixture is heated 3½ hours at 60–65° C., then diluted with 92 ml. water. Then there is added 34 g. of 50% sodium hydroxide solution to raise the pH to 7–7½. The mixture is refluxed several minutes to dissolve any unsulfonated BPA.

Then the mixture is cooled to 50–55° C. and 114.5 DPA (0.4 mol) is added. The mixture is refluxed several minutes to dissolve the DPA, cooled to 40–50° C. and then 31 g. of 50% sodium hydroxide solution is added to raise pH to 7–7½. Then there is added 29 g. (0.36 mol) of 37% formaldehyde. The mixture is heated to reflux and refluxed 8 hours.

Total product=380 g.

(6) Into a 1,000 ml., 3-neck flask, equipped with an agitator, reflux condenser, and thermometer, there is introduced 90 g. (0.9 mol) of sulfuric acid (98% technical). To this is added 114 g. (0.5 mol) of BPA. This mixture is heated 3½ hours at 60–65° C., then diluted with 228 ml. water, and neutralized with 85 g. of 50% sodium hydroxide solution to a pH of 7–7½. There are then added 139.7 g. (0.613 mol) of BPA and 3.6 g. (0.0125 mol) of DPA. The mixture is heated to reflux to dissolve the DPA and cooled to 75° C. approximately. There are then added 55 g. (0.68 mol) of 37% formaldehyde and a small amount of 50% sodium hydroxide solution so that the pH of a 10% solution is approximately 7.5. The mixture is then refluxed 8 hours, and finally cooled.

Total product=710 g.

(7) 420 g. of product as prepared in (1) above is diluted with 80 ml. of water. 50. g. of glycolic acid (70%) is added to acidify—ph of product=4.3 to 4.4.

The final material is clear and light amber in color.

(8) 420 g. of the product as prepared in (1) above is diluted with 80 ml. of water. Then 50 g. of glycolic acid (70%) and 29 to 30 g. of sulfuric acid solution (1 ml.=0.48 g. actual sulfuric acid) are added yielding a pH of the product equal to 3.1.

The final material is hazy and light amber in color.

(9) 100 parts of pickled calfskin are placed in a drum with 50 parts of water at room temperature. To this is added ½% of sulfuric acid diluted with a small amount of water. After running for ½ hour there is added 25 parts of the tanning agent described in (1) above which may be diluted with 10% water. The drum is run for ¼ hour at which time 1% sulfuric acid (diluted) is added and running continued for ¾ hour. The skins are then given 10% of a basic chrome sulfate in 50% water and drumming continued until tannage is complete. After neutralizing and fatliquoring, the skins are processed in the usual manner for making crushed grain leather, i.e. for example, by dry-milling in the drum with warm air, for several hours, say 5 to 8 hours.

(10) 100 parts of shaved chrome-tanned kidskin are thoroughly milled in a drum with water at 38–54° C. The liquor is then dropped and replaced with 20 parts of water at 38–54° C. to which is added 2–3% sulfuric acid. After running for ½ hour this liquor is drained off and replaced with 40 parts of the tanning agent described in Example 1 which has been suitably acidified with sulfuric acid and drumming continued for 2 hours maintaining a temperature of 38–54° C. The skins are then neutralized to a pH of 4 and fatliquored. After fatliquoring the skins are processed in the usual manner for crushed grain leather.

(11) 100 parts of split and shaved chrome tanned cowhide grains are thoroughly milled in a drum with water at 38–54° C. The liquor is then dropped and replaced with 30 parts of water at 38–54° C. to which is added 2–3% sulfuric acid. After running for ½ hour, 18½ parts of the spray-dried tanning agent described in Example 1 is added and the drum run for ¼ hour. 1% sulfuric acid is added and drumming run continued for 1¾ hours. The skins are then neutralized, fatliquored and processed as in (10) above.

(12) The processes of (10) and (11) are repeated except that the initial treatment with sulfuric acid is replaced by a treatment with oxalic acid.

(13) The process of (10) above is repeated through the neutralization, but, before fatliquoring, the skins are retanned with 5% of sodium zirconium sulfate. This yields a more pronounced pebble.

(14) The process of (10) above is repeated through the neutralization, but, before fatliquoring, the skins are retanned with 5% of quebracho.

We claim:

1. As a composition of matter adapted to be used for tanning purposes, a water-soluble condensation product of (1) an alkali metal salt of sulfonated p,p'-isopropylidenediphenol containing about 1.5 to 2 sulfonic groups per molecule, (2) formaldehyde, and (3) unsulfonated phenolic material selected from the group consisting of (a) 4,4-bis(4'-hydroxyphenyl) pentanoic acid and (b) mixtures of said acid and p,p'-isopropylidenediphenol containing at least about 2% by weight of said acid, the ratio of unsulfonated phenolic material (3) to the sulfonate (1) being about 0.5 to 2 moles of the former per mole of the latter, and the ratio of formaldehyde being from about 0.7 to 2.6 moles per mole of the sulfonate (1).

2. As a composition of matter adapted to be used for tanning purposes, a water-soluble condensation product of (1) an alkali metal salt of sulfonated p,p'-isopropylidenediphenol containing about 1.75 to 1.85 sulfonic groups per molecule, (2) formaldehyde, and (3) unsulfonated phenolic material selected from the group consisting of (a) 4,4-bis(4'-hydroxyphenyl)pentanoic acid and (b) mixtures of said acid and p,p'-isopropylidenediphenol containing at least about 2% by weight of said acid, the ratio of unsulfonated phenolic material (3) to the sulfonate (1) being about 1.2 to 1.3 moles of the former per mole of the latter, and the ratio of formaldehyde being from about 0.5 to 0.7 mole per mole of the phenolic material including both sulfonated and unsulfonated.

3. As a composition of matter adapted to be used for tanning purposes, a water-soluble condensation product of (1) an alkali metal salt of sulfonated p,p'-isopropylidenediphenol containing about 1.5 to 2 sulfonic groups per molecule, (2) formaldehyde, and (3) unsulfonated 4,4-bis(4'-hydroxyphenyl) pentanoic acid, the ratio of unsulfonated phenolic material (3) to the sulfonate (1) being about 0.5 to 2 moles of the former per mole of the latter, and the ratio of formaldehyde being from about 0.7 to 2.6 moles per mole of the sulfonate (1).

4. As a composition of matter adapted to be used for tanning purposes, a water-soluble condensation product of (1) an alkali metal salt of sulfonated p,p'-isopropylidenediphenol containing about 1.5 to 2 sulfonic groups per molecule, (2) formaldehyde, and (3) unsulfonated phenolic material consisting of a mixture of 4,4-bis(4'-hydroxyphenyl)pentanoic acid and p,p'-isopropylidenediphenol containing at least 2% of the acid, the ratio of unsulfonated phenolic material (3) to the sulfonate (1) being about 0.5 to 2 moles of the former per mole of the latter, and the ratio of formaldehyde being from about 0.7 to 2.6 moles per mole of the sulfonate (1).

5. As a composition of matter adapted to be used for tanning purposes, a water-soluble condensation product of (1) an alkali metal salt of sulfonated p,p'-isopropylidenediphenol containing about 1.75 to 1.85 sulfonic groups per molecule, (2) formaldehyde, and (3) unsulfonated 4,4 - bis(4' - hydroxyphenyl)pentanoic acid, the ratio of unsulfonated phenolic material (3) to the sulfonate (1) being about 1.2 to 1.3 moles of the former per mole of the latter, and the ratio of formaldehyde being from about 0.5 to 0.7 mole per mole of the phenolic material including both sulfonated and unsulfonated.

6. As a composition of matter adapted to be used for tanning purposes, a water-soluble condensation product of (1) an alkali metal salt of sulfonated p,p'-isopropylidenediphenol containing about 1.75 to 1.85 sulfonic groups per molecule, (2) formaldehyde, and (3) unsulfonated phenolic material consisting of a mixture of 4,4-bis(4'-hydroxyphenyl)pentanoic acid and p,p'-isopropylidenediphenol containing at least 2% of the acid, the ratio of unsulfonated phenolic material (3) to the sulfonate (1) being about 1.2 to 1.3 moles of the former per mole of the latter, and the ratio of formaldehyde being from about 0.5 to 0.7 mole per mole of the sulfonate (1).

7. A process of making a condensation product suitable for tanning which comprises heating a mixture of
  (1) an alkali metal salt of sulfonated p,p'-isopropylidenediphenol containing about 1.5 to 2 sulfonic groups per molecule,
  (2) formaldehyde, and
  (3) unsulfonated phenolic material selected from the group consisting of (a) 4,4-bis(4'-hydroxyphenyl) pentanoic acid and (b) mixtures of said acid and p,p'-isopropylidenediphenol containing at least about 2% by weight of said acid, the ratio of unsulfonated phenolic material (3) to the sulfonate (1) being about 0.5 to 2 moles of the former per mole of the latter, and the ratio of formaldehyde being from about 0.7 to 2.6 moles per mole of the sulfonate (1), at a temperature of 85 to 130° C. for a period of at least two hours.

References Cited

FOREIGN PATENTS 10,742   6/1963   Japan.

DANIEL D. HORWITZ, *Primary Examiner.*